(12) United States Patent
Zhang et al.

(10) Patent No.: US 11,514,264 B2
(45) Date of Patent: Nov. 29, 2022

(54) METHOD AND APPARATUS FOR TRAINING CLASSIFICATION MODEL, AND CLASSIFICATION METHOD

(71) Applicant: FUJITSU LIMITED, Kawasaki (JP)

(72) Inventors: Meng Zhang, Beijing (CN); Fei Li, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 253 days.

(21) Appl. No.: 17/076,320

(22) Filed: Oct. 21, 2020

(65) Prior Publication Data

US 2021/0150261 A1     May 20, 2021

(30) Foreign Application Priority Data

Nov. 15, 2019   (CN) .......................... 201911119156.0

(51) Int. Cl.
  *G06K 9/62*      (2022.01)
  *G06N 3/08*      (2006.01)
(52) U.S. Cl.
  CPC ......... *G06K 9/6232* (2013.01); *G06K 9/6267* (2013.01); *G06N 3/08* (2013.01)
(58) Field of Classification Search
  CPC .......... A63B 37/00221; A63B 37/0074; A63B 37/12; A63B 45/00; B05D 7/02; B05D 7/534; C08J 7/043; Y10S 273/22; G06K 9/6232; G06K 9/6267; G06N 3/0454; G06N 3/08; G06V 10/764
See application file for complete search history.

(56) References Cited

U.S. PATENT DOCUMENTS

| 7,996,762 B2* | 8/2011 | Qi ........................ G06F 16/7847 715/233 |
| 10,417,532 B2* | 9/2019 | Liang ........................ G06N 3/04 |
| 10,685,008 B1* | 6/2020 | Kurve ..................... G10L 17/18 |
| 2009/0049002 A1* | 2/2009 | He ......................... G06N 20/00 707/999.107 |
| 2010/0310158 A1* | 12/2010 | Fu ........................ G06V 10/764 382/165 |

(Continued)

OTHER PUBLICATIONS

Hongyu Pan, "Mean-Variance Loss for Deep AgeEstimation From a Face," Jun. 2018, Proceedings of the IEEE Conference on Computer Vision and Pattern Recognition (CVPR), 2018, pp. 5285-5290.*

(Continued)

*Primary Examiner* — Omar S Ismail
(74) *Attorney, Agent, or Firm* — WHDA, LLP (57) ABSTRACT

A method for training a classification model includes: performing training on the classification model using first and second sample sets, to calculate a classification loss; extracting a weight vector and a feature vector of each sample; calculating a mean weight vector and a mean feature vector of all samples in the first sample set; calculating a weight loss based on a difference of the weight vector of each sample in the second sample set from the mean weight vector, and calculating a feature loss based on a difference of a feature vector of each sample in the second sample set from the mean feature vector; calculating a total loss of the classification model based on the classification loss and at least one of the feature loss and the weight loss; and adjusting a parameter of the classification model until a predetermined condition is satisfied.

20 Claims, 4 Drawing Sheets

(56) References Cited

U.S. PATENT DOCUMENTS

| | | | | |
|---|---|---|---|---|
| 2012/0088219 | A1* | 4/2012 | Briscoe | G06N 20/10 |
| | | | | 434/362 |
| 2019/0012526 | A1* | 1/2019 | Guo | G06N 3/0454 |
| 2019/0339688 | A1* | 11/2019 | Celia | G05B 23/0229 |
| 2020/0035224 | A1* | 1/2020 | Ward | G06N 3/084 |
| 2020/0097771 | A1* | 3/2020 | Min | G06K 9/6262 |
| 2020/0394557 | A1* | 12/2020 | Boult | G06K 9/6262 |

OTHER PUBLICATIONS

Hao Wang,"CosFace: Large Margin Cosine Loss for Deep Face Recognition,"Jun. 2018, Proceedings of the IEEE Conference on Computer Vision and Pattern Recognition (CVPR),2018,pp. 5265-5270.*

Steve Lawrence,"Face Recognition: A Convolutional Neural-Network Approach,"Jan. 1997,IEEE Transactions on Neural Networks, vol. 8, No. 1, Jan. 1997,pp. 98-109.*

Guohang Zeng,"Hand-crafted Feature Guided Deep Learning for Facial Expression Recognition,"Jun. 7, 2018,2018 13th IEEE International Conference on Automatic Face & Gesture Recognition, Jan. 1997, pp. 423-427.*

Guodong Guo,"A survey on deep learning based face recognition,"Dec. 2019,Computer Vision and Image Understanding 189 (2019) 102805,pp. 2-18.*

Guoying Zhao,"Dynamic Texture Recognition Using Local Binary Patterns with an Application to Facial Expressions,"Apr. 23, 2007, IEEE Transactions on Pattern Analysis and Machine Intelligence, vol. 29, No. 6, Jun. 2007,pp. 915-925.*

Alessandro Calefati,"Git Loss for Deep Face Recognition,"Jul. 28, 2018,Computer Vision and Pattern Recognition,pp. 1-7.*

Tong Zhang,"A Deep Neural Network-Driven Feature Learning Method for Multi-view Facial Expression Recognition,"Aug. 3, 2016,IEEE Transactions on Multimedia, vol. 18, No. 12, Dec. 2016, pp. 2528-2532.*

Pan Hongyu et al; "Mean-Variance Loss for Deep Age Estimation from a Face", 2018 IEEE/CVF Conference on Computer Vision and Pattern Recognition, IEEE, Jun. 18, 2018 (Jun. 18, 2018), pp. 5285-5294, XP033473441; Cited in Extended European Search Report dated Mar. 22, 2021. (10 pages).

Karaman Kaan et al; "Face recognition based on embedding learning", Proceedings of SPIE; [Proceedings of SPIE; ISSN 0277-786X; vol. 8615], SPIE, 1000 20th St. Bellingham WA 98225-6705 USA vol. 10802, Oct. 8, 2018 (Oct. 8, 2018), pp. 108020J-108020J, XP060112526; Cited in Extended European Search Report dated Mar. 22, 2021. (8 pages).

Zeng Guohang et al; "Hand-Crafted Feature Guided Deep Learning for Facial Expression Recognition", 2018 13th IEEE International Conference on Automatic Face & Gesture Recognition (FG 2018). IEEE, May 15, 2018 (May 15, 2018), pp. 423-430, XP033354730; Cited in Extended European Search Report dated Mar. 22, 2021. (8 pages).

Extended (Supplementary) European Search Report dated Mar. 22, 2021, issued in counterpart EP Application No. 20201738.0. (6 pages).

Calefati, Alessandro et al., "Git Loss for Deep Face Recognition", Jul. 28, 2018 (Jul. 28, 2018), XP055876473, Retrieved from the Internet: <URL:https://arxiv.org/pdf/1807.08512.pdf>; Cited in EP Office Action dated Jan. 13, 2022. (12 pages).

Guo, Guodong et al., "A survey on deep learning based face recognition", Computer Vision and Image Understanding, Academic Press, US, vol. 189, Aug. 29, 2019 (Aug. 29, 2019), XP085899461; Cited in EP Office Action dated Jan. 13, 2022. (37 pages).

Office Action dated Jan. 13, 2022, issued in counterpart EP Application No. 20201738.0. (7 pages).

* cited by examiner

METHOD AND APPARATUS FOR TRAINING CLASSIFICATION MODEL, AND CLASSIFICATION METHOD

CROSS-REFERENCE TO RELATED APPLICATIONS

This application claims the priority benefit of Chinese Patent Application No. 201911119156.0, filed on Nov. 15, 2019 in the China National Intellectual Property Administration, the disclosure of which is incorporated herein in its entirety by reference.

FIELD

The present disclosure relates to the field of information processing, and in particular to a method and an apparatus for training a classification model and a classification method.

BACKGROUND

In recent years, the technical level of image recognition, especially face recognition, is greatly improved due to the rapid development of deep convolutional neural networks. In addition to an evolving framework, collection for a large-scale training sample set also plays a vital role in the face recognition. However, in real world, face data samples are usually in a long tail distribution. That is, there are enough samples only for a small number of people, but there are very few samples for most other people. It is difficult to obtain a model with good recognition performance by training a face recognition model using such a training sample set in a long tail distribution, resulting in low accuracy when recognizing faces using the model.

SUMMARY

A brief summary of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is merely to provide some concepts of the present disclosure in a simplified form, as preamble of a detailed description later.

In view of the above technical problems, an object of the present disclosure is to provide a method and an apparatus for training a classification model and a classification method, so as to overcome one or more disadvantages in the conventional technology.

A method for training a classification model is provided according to an aspect of the present disclosure. The method includes: performing training on the classification model using a first sample set and a second sample set, to calculate a classification loss of the classification model; extracting a weight vector and a feature vector of each sample in the first sample set and the second sample set; calculating a mean weight vector of weight vectors of all samples in the first sample set and a mean feature vector of feature vectors of all samples in the first sample set; calculating a weight loss based on a difference of the weight vector of each sample in the second sample set from the mean weight vector, and calculating a feature loss based on a difference of the feature vector of each sample in the second sample set from the mean feature vector; calculating a total loss of the classification model based on the classification loss and at least one of the feature loss and the weight loss; and adjusting a parameter of the classification model based on the total loss until a predetermined condition is satisfied, to obtain a trained classification model.

An apparatus for training a classification model is provided according to another aspect of the present disclosure. The apparatus includes a training unit, a vector extracting unit, a mean vector calculating unit, a loss calculating unit, a total loss calculating unit and an adjusting unit. The training unit is configured to perform training on the classification model using a first sample set and a second sample set, to calculate a classification loss of the classification model. The vector extracting unit is configured to extract a weight vector and a feature vector of each sample in the first sample set and the second sample set. The mean vector calculating unit is configured to calculate a mean weight vector of weight vectors of all samples in the first sample set and a mean feature vector of feature vectors of all samples in the first sample set. The loss calculating unit is configured to calculate a weight loss based on a difference of the weight vector of each sample in the second sample set from the mean weight vector, and to calculate a feature loss based on a difference of the feature vector of each sample in the second sample set from the mean feature vector. The total loss calculating unit is configured to calculate a total loss of the classification model based on the classification loss and at least one of the feature loss and the weight loss. The adjusting unit is configured to adjust a parameter of the classification model based on the total loss until a predetermined condition is satisfied, to obtain a trained classification model.

A classification method for performing classification on an object to be classified with a classification model obtained by performing training using the above method or apparatus is provided according to another aspect of the present disclosure. The classification method includes: inputting the object to be classified into the classification model, and performing classification on the object to be classified based on an output of at least one of feature extraction layers of the classification model.

A computer program code and a computer program product for implementing the above method according to the present disclosure as well as a computer-readable storage medium having the computer program code for implementing the above method according to the present disclosure recorded thereon are further provided according to other aspects of the present disclosure.

Other aspects of embodiments of the present disclosure are given in the following description, in which a detailed description is used to fully disclose preferred embodiments among the embodiments of the present disclosure without limitations on them.

BRIEF DESCRIPTION OF THE DRAWINGS

The present disclosure may be better understood by referring to the detailed description given below in conjunction with the drawings. The same or similar reference numerals are used in all the drawings to denote the same or similar components. The drawings together with the following detailed description are included in the specification and form a part of the specification, to further illustrate the preferred embodiments of the present disclosure and explain the principles and advantages of the present disclosure by examples. In the drawings.

DETAILED DESCRIPTION OF EMBODIMENTS

Exemplary embodiments of the present disclosure are described hereinafter in conjunction with the drawings. For conciseness and clarity, not all features of an actual embodiment are described in this specification. However, it should be understood that numerous embodiment-specific decisions, for example, in accord with constraining conditions related to system and business, should be made when developing any of such actual embodiments, so as to achieve specific targets of a developer. These constraining conditions may vary with different embodiments. Furthermore, it should further be understood that although development work may be complicated and time-consuming, for those skilled in the art benefiting from the present disclosure, such development work is only a routine task.

Here, it should further be noted that in order to avoid obscuring the present disclosure due to unnecessary details, only an device structure and/or processing step closely related to the solutions according to the present disclosure are illustrated in the drawings, and other details less related to the present disclosure are omitted.

Hereinafter, embodiments of the present disclosure are described in detail with reference to the drawings.

Figure 1:
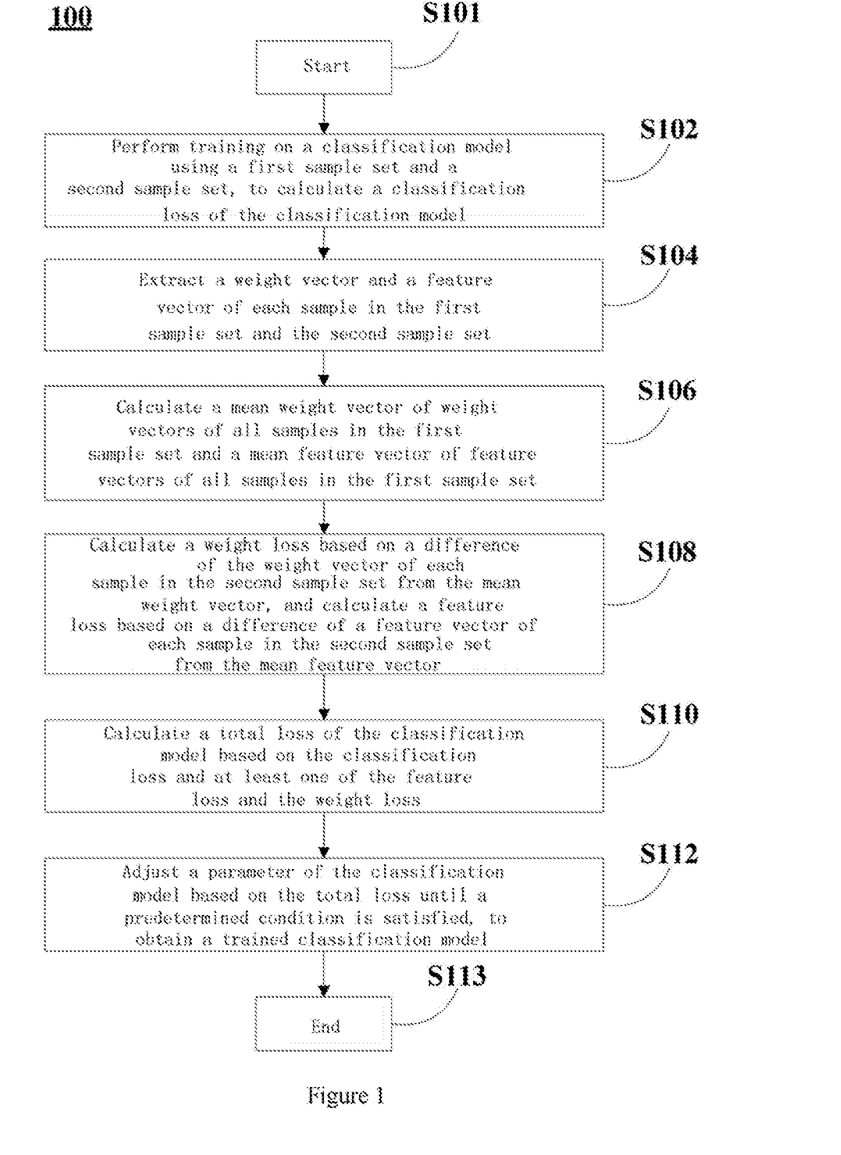
FIG. 1 is a flowchart showing a method for training a classification model according to an embodiment of the present disclosure.

First, reference is made to FIG. 1, which is a flowchart of a method for training a classification model according to an embodiment of the present disclosure. As shown in FIG. 1, a method 100 for training a classification model according to the embodiment of the present disclosure may include the steps S101 to S113.

In step S102, the classification model is trained using a first sample set and a second sample set, to calculate a classification loss of the classification model.

According to an embodiment of the present disclosure, the first sample set may refer to a head data sample set in an entire sample set, and the second sample set may refer to a long tail data sample set other than the first sample set in the entire sample set. Those skilled in the art may use a set constituted by a sample for which the number of the sample is not less than a predetermined threshold in a training sample set as the head data sample set, and a set constituted by a sample for which the number of the sample is less than the predetermined threshold in the training sample set as a long tail data sample set as needed.

According to an embodiment of the present disclosure, in step S102, the classification loss of the classification model may be calculated by using a loss function commonly used in the art, for example, a Softmax loss function. In addition, those skilled in the art may think of other examples of loss functions, which are not described herein.

According to an embodiment of the present disclosure, the classification model may be but is not limited to a model based on a neural network, such as a convolutional neural network (CNN) model. Those skilled in the art may select an appropriate model as actual needs, and details are not described herein.

In step S104, a weight vector and a feature vector of each sample in the first sample set and the second sample set are extracted.

The weight vector and the feature vector of each sample may be obtained by the methods commonly used in the art, which are not described in detail herein.

In step S106, a mean weight vector of weight vectors of all samples in the first sample set and a mean feature vector of feature vectors of all samples in the first sample set are calculated.

According to an embodiment of the present disclosure, the mean weight vector of weight vectors of all samples in the first sample set and the mean feature vector of feature vectors of all samples in the first sample set may be calculated based on the following equations (1) and (2), respectively.

$$w_{mean} = \frac{1}{m} \sum_{j \in C_h} \|w_j\|_2^2 \qquad (1)$$

$$f_{mean} = \frac{1}{m} \sum_{j \in C_h} \|f_j\|_2^2 \qquad (2)$$

where $w_{mean}$ represents the mean weight vector, m represents the number of first samples in the first sample set, $C_h$ represents the first sample set, $w_j$ represents a weight vector of a j-th sample in the first sample set, $f_{mean}$ represents the mean feature vector, $f_j$ represents a feature vector of a j-th sample in the first sample set.

In step S108, a weight loss is calculated based on a difference of the weight vector of each sample in the second sample set from the mean weight vector, and a feature loss is calculated based on a difference of the feature vector of each sample in the second sample set from the mean feature vector.

According to an embodiment of the present disclosure, the weight loss and the feature loss may be calculated based on the following equations (3) and (4), respectively.

$$L_{W\_up} = \sum_{i \in C_l} \|\|w_i\|_2^2 - w_{mean}\| \qquad (3)$$

$$L_{F\_up} = \sum_{i \in C_l} \|\|f_i\|_2^2 - f_{mean}\| \qquad (4)$$

where $L_{W\_up}$ represents the weight loss, $C_l$ represents the second sample set, $w_i$ represents a weight vector of an i-th sample in the second sample set, $L_{F\_up}$ represents the feature loss, and $f_i$ represents a feature vector of an i-th sample in the second sample set.

In step S110, a total loss of the classification model is calculated based on the classification loss and at least one of the feature loss and the weight loss.

According to an embodiment of the present disclosure, the total loss of the classification model may be calculated based on the following equation (5).

$$L = L_C + \lambda_1 L_{W\_up} + \lambda_2 L_{F\_up} \qquad (5)$$

where L represents the total loss of the classification model, $L_C$ represents the classification loss of the classification model calculated in step S102, and $\lambda_1$ and $\lambda_2$ are hyper-parameters.

$\lambda_1$ and $\lambda_2$ may determine which one or more of the losses $L_C$, $L_{W\_up}$ and $L_{F\_up}$ play a leading role in the total loss L. Those skilled in the at may set values of $\lambda_1$ and $\lambda_2$ based on actual needs, and may calculate the total loss of the classification model based on the classification loss and one or both of the feature loss and the weight loss.

In a case that the total loss of the classification model is calculated based on the classification loss $L_C$ of the classification model, the feature loss $L_{F\_up}$, and the weight loss $L_{W\_up}$, $\lambda_1$ is set to be greater than 0 and $\lambda_2$ is set to be greater than 0 in equation (5).

In a case that the total loss of the classification model is calculated based on the classification loss $L_C$ of the classification model and the weight loss $L_{W\_up}$, $\lambda_1$ is set to be greater than 0 and $\lambda_2$ is set to be 0 in equation (5). In this case, only the weight vector of each sample in the first sample set and the second sample set is extracted in step S104. Only the mean weight vector of weight vectors of all samples in the first sample set is calculated in step S106. Only the weight loss is calculated based on the difference of the weight vector of each sample in the second sample set from the mean weight vector in step S108.

In a case that the total loss of the classification model is calculated based on the classification loss $L_C$ of the classification model and the feature loss $L_{F\_up}$, $\lambda_1$ is set to be 0 and $\lambda_2$ is set to be greater than 0 in equation (5). In this case, only the feature vector of each sample in the first sample set and the second sample set is extracted in step S104. Only the mean feature vector of feature vectors of all samples in the first sample set is calculated in step S106. Only the feature loss is calculated based on the difference of the feature vector of each sample in the second sample set from the mean feature vector in step S108.

In step S112, a parameter of the classification model is adjusted based on the total loss until a predetermined condition is satisfied, to obtain a trained classification model.

According to an embodiment of the present disclosure, in step S112, the parameter of the classification model is adjusted to minimize the total loss. Then, steps S102 to S112 are iteratively performed until the predetermined condition is satisfied. According to an embodiment of the present disclosure, the predetermined condition may be that the total loss of the classification model reaches a predetermined value (small enough) or the iteration reaches a predetermined number of times. Those skilled in the art may set the predetermined condition based on actual needs, which are not described herein.

The method for training a classification model according to the embodiment of the present disclosure is applicable to various fields. For example, the method for training a classification model according to the embodiment of the present disclosure may be applied to the field of face recognition. In face recognition, a set constituted by face image samples of a person for which the number of the face image samples is not less than a predetermined threshold may be defined as the head data sample set (first sample set), and a set constituted by face image samples of a person for which the number of the face image samples is less than the predetermined threshold may be defined as the long tail data sample set (second sample set). Those skilled in the art may appropriately set the predetermined threshold based on actual needs.

However, in real world, face data samples are usually in a long tail distribution. That is, there are enough samples only for a small number of people, but there are very few samples for most other people. It is difficult to obtain a model with good recognition performance by training a face recognition model (classification model) using such a training sample set in a long tail distribution, resulting in low accuracy when recognizing faces using the model. This is because that when the classification model is trained using an entire training data sample set, modulus of the weight vector and the feature vector of the long tail data sample are very small compared with the head data sample, seriously affecting recognition performance of the model and accuracy of face recognition.

In the method for training a classification model according to the embodiment of the present disclosure, the weight loss is calculated based on the difference of the weight vector of each sample in the long tail data sample set (second sample set) from the mean weight vector of weight vectors of all samples in the head data sample set (first sample set). The feature loss is calculated based on the difference of the feature vector of each sample in the long tail data sample set (second sample set) from the mean feature vector of feature vectors of all samples in the head data sample set (first sample set). The total loss of the classification model is calculated based on the feature loss and/or the weight loss. With the method for training a classification model according to the embodiment of the present disclosure, the modulus of the weight vector and the feature vector of the long tail data sample can be substantially equal to modulus of the weight vector and the feature vector of the head data sample, thereby greatly improving the recognition (classification) performance of the classification model and the accuracy of face recognition. Therefore, a classification model with good classification performance can be obtained with the method for training a classification model according to the embodiment of the present disclosure, thereby greatly improving the accuracy of classification.

It should be noted that although an example in which the method for training a classification model according to the embodiment of the present disclosure is applied to the field of face recognition is described, applications of the method for training a classification model is not limited thereto. Those skilled in the art may apply the method for training a classification model to various fields based on actual needs, such as animal identification, which is not described herein.

Corresponding to the above method for training a classification model, the following apparatus for training a classification model is further provided according to the present disclosure.

Figure 2:
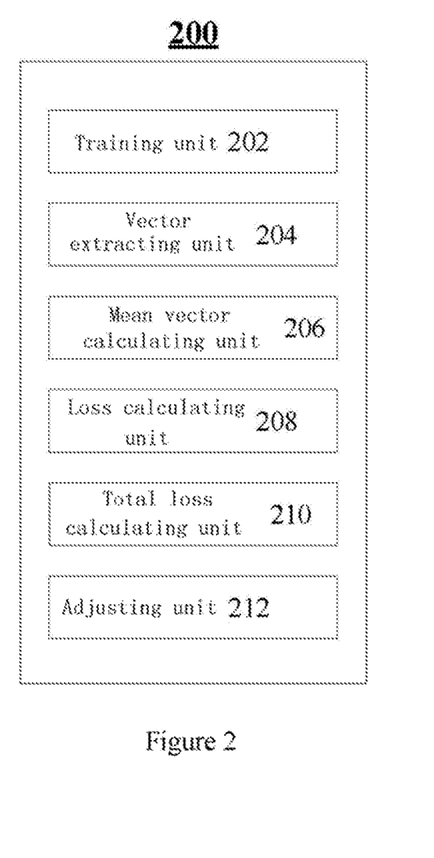
FIG. 2 is a block diagram showing an apparatus for training a classification model according to an embodiment of the present disclosure.

FIG. 2 is a block diagram showing the apparatus for training a classification model according to an embodiment of the present disclosure. As shown in FIG. 2, the apparatus 200 for training a classification model according to the embodiment of the present disclosure includes a training unit 202, a vector extracting unit 204, a mean vector calculating unit 206, a loss calculating unit 208, a total loss calculating unit 210 and an adjusting unit 212.

The training unit 202 may be configured to perform training on the classification model using a first sample set and a second sample set, to calculate a classification loss of the classification model. The vector extracting unit 204 may be configured to extract a weight vector and a feature vector of each sample in the first sample set and the second sample set. The mean vector calculating unit 206 may be configured to calculate a mean weight vector of weight vectors of all samples in the first sample set and calculate a mean feature vector of feature vectors of all samples in the first sample set. The loss calculating unit 208 may be configured to calculate a weight loss based on a difference of the weight vector of each sample in the second sample set from the mean weight vector, and to calculate a feature loss based on a difference of the feature vector of each sample in the second sample set from the mean feature vector. The total loss calculating unit 210 may be configured to calculate a total loss of the classification model based on the classification loss and at least one of the feature loss and the weight loss. The adjusting unit 212 may be configured to adjust a parameter of the classification model based on the total loss until a predetermined condition is satisfied, to obtain a trained classification model.

According to an embodiment of the present disclosure, the first sample set may refer to a head data sample set in an entire sample set, and the second sample set may refer to a long tail data sample set other than the first sample set in the entire sample set. Those skilled in the art may use a set constituted by a sample for which the number of the sample is not less than a predetermined threshold in a training sample set as the head data sample set, and a set constituted by a sample for which the number of the sample is less than the predetermined threshold in the training sample set as a long tail data sample set as needed.

According to an embodiment of the present disclosure, the training unit 202 may calculate the classification loss of the classification model by using a Softmax loss function. In addition, those skilled in the art may think of other examples of loss functions, which are not described herein.

According to an embodiment of the present disclosure, the classification model may be but is not limited to a model based on a neural network, such as a convolutional neural network (CNN) model. Those skilled in the art may select an appropriate model as actual needs, and details are not described herein.

According to an embodiment of the present disclosure, the vector extracting unit 204 may obtain the weight vector and the feature vector of each sample by using the methods commonly used in the art, which are not described in detail herein.

According to an embodiment of the present disclosure, the mean vector calculating unit 206 may calculate the mean weight vector of weight vectors of all samples in the first sample set and the mean feature vector of feature vectors of all samples in the first sample set based on the above equations (1) and (2), respectively.

According to an embodiment of the present disclosure, the loss calculating unit 208 may calculate the weight loss and the feature loss based on the above equations (3) and (4), respectively.

According to an embodiment of the present disclosure, the total loss calculating unit 210 may calculate the total loss of the classification model based on the above equation (5).

In a case that the total loss of the classification model is calculated based on the classification loss $L_C$ of the classification model, the feature loss $L_{F\_up}$, and the weight loss $L_{W\_up}$, $\lambda_1$ is set to be greater than 0 and $\lambda_2$ is set to be greater than 0 in the above equation (5).

In a case that the total loss of the classification model is calculated based on the classification loss $L_C$ of the classification model and the weight loss $L_{W\_up}$, $\lambda_1$ is set to be greater than 0 and $\lambda_2$ is set to be 0 in the above equation (5). In this case, the vector extracting unit 204 may extract only the weight vector of each sample in the first sample set and the second sample. The mean vector calculating unit 206 may calculate only the mean weight vector of weight vectors of all samples in the first sample set. The loss calculating unit 208 may calculate only the weight loss based on the difference of the weight vector of each sample in the second sample set from the mean weight vector.

In a case that the total loss of the classification model is calculated based on the classification loss $L_C$ of the classification model and the feature loss $L_{F\_up}$, $\lambda_1$ is set to be 0 and $\lambda_2$ is set to be greater than 0 in the above equation (5). In this case, the vector extracting unit 204 may extract only the feature vector of each sample in the first sample set and the second sample. The mean vector calculating unit 206 may calculate only the mean feature vector of feature vectors of all samples in the first sample set. The loss calculating unit 208 may calculate only the feature loss based on the difference of the feature vector of each sample in the second sample set from the mean feature vector.

According to an embodiment of the present disclosure, the adjusting unit 212 may adjust the parameter of the classification model to minimize the total loss. Then, processing performed by the training unit 202, the vector extracting unit 204, the mean vector calculating unit 206, the loss calculating unit 208, the total loss calculating unit 210 and the adjusting unit 212 is iteratively performed until the predetermined condition is satisfied. According to an embodiment of the present disclosure, the predetermined condition may be that the total loss of the classification model reaches a predetermined value (small enough) or the iteration reaches a predetermined number of times. Those skilled in the art may set the predetermined condition based on actual needs, which are not described herein.

Similar to the above method for training a classification model according to the embodiment of the present disclosure, the apparatus for training a classification model according to the embodiment of the present disclosure is also applicable to various fields. For example, the apparatus for training a classification model according to the embodiment of the present disclosure may be applied to the field of face recognition.

With the apparatus for training a classification model according to the embodiment of the present disclosure, the weight loss is calculated based on the difference of the weight vector of each sample in the long tail data sample set (second sample set) from the mean weight vector of weight vectors of all samples in the head data sample set (first sample set). The feature loss is calculated based on the difference of the feature vector of each sample in the long tail data sample set (second sample set) from the mean feature vector of feature vectors of all samples in the head data sample set (first sample set). The total loss of the classification model is calculated based on the feature loss and/or the weight loss. With the apparatus for training a classification model according to the embodiment of the present disclosure, the modulus of the weight vector and the feature vector of the long tail data sample can be substantially equal to modulus of the weight vector and the feature vector of the head data sample, thereby greatly improving the recognition (classification) performance of the classification model and the accuracy of face recognition. Therefore, a classification model with good classification performance can be obtained with the apparatus for training a classification model according to the embodiment of the present disclosure, thereby greatly improving the accuracy of classification.

It should be noted that although an example in which the apparatus for training a classification model according to the embodiment of the present disclosure is applied to the field of face recognition is described, applications of the apparatus for training a classification model is not limited thereto. Those skilled in the art may apply the apparatus for training a classification model to various fields based on actual needs, such as animal identification, which is not described herein.

In addition, a classification method for performing classification on an object to be classified with a classification model obtained by performing training using the above method or apparatus for training a classification model is provided according to the present disclosure.

Figure 3:
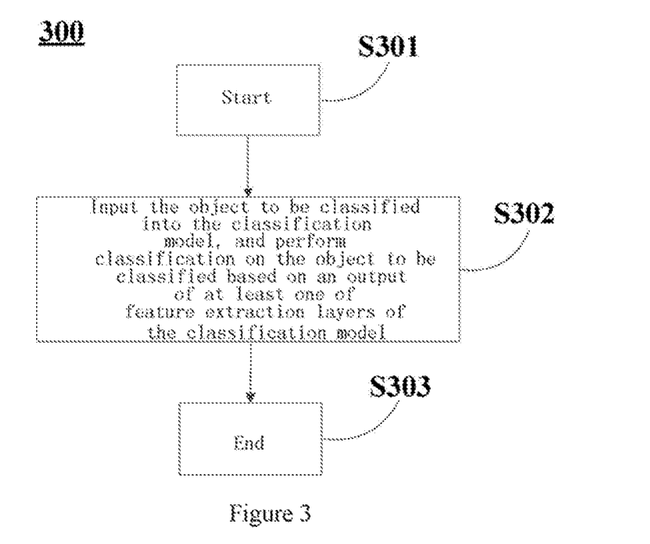
FIG. 3 is a flowchart showing a classification method using a classification model according to an embodiment of the present disclosure.

FIG. 3 is a flowchart showing a classification method for performing classification on the object to be classified with the obtained classification model according to an embodiment of the present disclosure. As shown in FIG. 3, a classification method 300 according to the embodiment of the present disclosure may include a start step S301, a classification step 302, and an end step S303. In the classification step S302, the object to be classified nay be inputted into the classification model, and the object to be classified may be classified based on an output of at least one of the feature extraction layers of the classification model.

For example, multiple objects may be inputted into the classification model in advance, to obtain outputs of the feature extraction layer for the multiple objects. In this case, in the classification step S302, the object to be classified may be inputted into the classification model, and the object to be classified is classified based on a comparison between the output of at least one of the feature extraction layers for the object to be classified and the output of the corresponding feature extraction layer for each of the multiple objects. For example, in the classification step S302, the object to be classified may be determined as an object with a minimum difference between the output of the corresponding feature extraction layer for the object and the output of the corresponding feature extraction layer for the object to be classified.

In addition, for example, another object may be inputted into the classification model while inputting the object to be classified into the classification model. In this case, in the classification step S302, the object to be classified may be classified based on a comparison between the output of at least one of the feature extraction layers for the object to be classified and an output of the corresponding feature extraction layer for another object. For example, in the classification step S302, the object to be classified may be determined as another object in a case that a difference between the output of the corresponding feature extraction layer for the object to be classified and the output of the corresponding feature extraction layer for another object is less than a predetermined threshold.

In an example, the classification model is a convolutional neural network model including a fully connected layer as a feature extraction layer and at least one convolutional layer. In this case, in the classification step S302, the object to be classified may be classified based on an output of the fully connected layer.

Corresponding to the above classification method using the classification model, a classification apparatus for performing classification on an object to be classified with the classification model obtained by performing training using the above method or apparatus for training a classification model is further provided according to the present disclosure.

Figure 4:
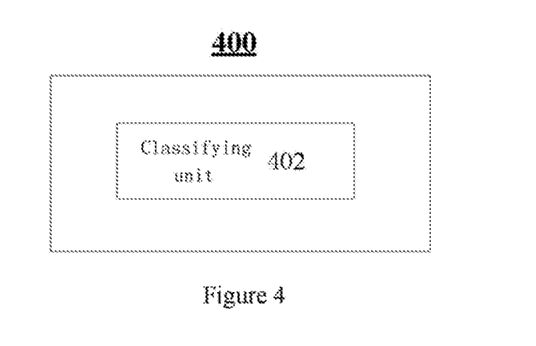
FIG. 4 is a block diagram showing a classification apparatus using a classification model according to an embodiment of the present disclosure.

FIG. 4 is a block diagram showing a classification apparatus for performing classification on the object to be classified with the obtained classification model according to an embodiment of the present disclosure. As shown in FIG. 4, a classification apparatus 400 for classification using a classification model according to the embodiment of the present disclosure may include a classifying unit 402, which may be configured to input the object to be classified into a classification model and classify the object to be classified based on an output of at least one of the feature extraction layers of the classification model.

For example, the classification apparatus 400 may input multiple objects into the classification model in advance, to obtain outputs of the feature extraction layer for the multiple objects. In this case, the classifying unit 402 may input the object to be classified into the classification model and classify the object to be classified based on a comparison between the output of at least one of the feature extraction layers for the object to be classified and the output of the corresponding feature extraction layer for each of the multiple objects. For example, the classifying unit 402 may determine the object to be classified as an object with a minimum difference between the output of the corresponding feature extraction layer for the object and the output of the corresponding feature extraction layer for the object to be classified.

In addition, for example, the classifying unit 402 may input another object into the classification model while inputting the object to be classified into the classification model. The classifying unit 402 may classify the object to be classified based on a comparison between the output of at least one of the feature extraction layers for the object to be classified and an output of the corresponding feature extraction layer for another object. For example, the classifying unit 402 may determine the object to be classified as another object in a case that a difference between the output of the corresponding feature extraction layer for the object to be classified and the output of the corresponding feature extraction layer for another object is less than a predetermined threshold.

In an example, the classification model is a convolutional neural network model including a fully connected layer as a feature extraction layer and at least one convolutional layer. In this case, the classifying unit 402 may classify the object to be classified based on an output of the fully connected layer.

It should be noted that functional configurations and operations of the method and the apparatus for training a classification model as well as the classification method and the classification apparatus using the classification model according to the embodiments of the present disclosure are described above, which are only examples rather than limitations. Those skilled in the art may modify the above embodiments according to principles of the present disclosure, for example, may add, delete, or combine functional modules in each embodiment. Such modifications fall within the scope of the present disclosure.

In addition, it should further be pointed out that the apparatus embodiment here corresponds to the above method embodiment. Therefore, details not described in detail in the apparatus embodiment may refer to the corresponding description in the method embodiment, and are not repeated here.

It should be understood that machine-executable instructions in the storage medium and the program product according to the embodiments of the present disclosure may be configured to execute the above classification method. Therefore, details not described in detail here may refer to the above corresponding description, and are not repeated herein.

Correspondingly, a storage medium for carrying the above program product including the machine-executable instructions is also included in the present disclosure. The storage medium includes but is not limited to a floppy disk, an optical disk, a magneto-optical disk, a memory card, a memory stick, and the like.

In addition, it should further be pointed out that the above series of processing and apparatuses may also be implemented by software and/or firmware. In a case that the above series of processing and apparatuses are implemented by software and/or firmware, a program constituting the software is installed from a storage medium or network to a computer with a dedicated hardware structure, for example, a general-purpose personal computer 500 shown in FIG. 5. The computer can perform various functions when being installed with various programs.

Figure 5:
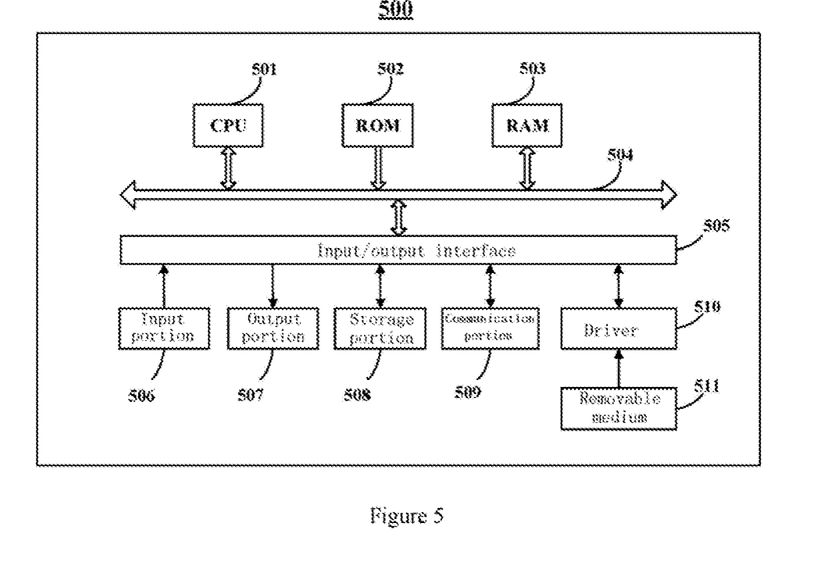
FIG. 5 is a block diagram showing an exemplary structure of a personal computer that may be used in an embodiment of the present disclosure.

In FIG. 5, a central processing unit (CPU) 501 performs various processing based on programs stored in a read only memory (ROM) 502 or programs loaded from a storage portion 508 to a random access memory (RAM) 503. Data required when the CPU 501 performs various processing is also stored in the RAM 503 as needed.

The CPU 501, the ROM 502, and the RAM 503 are connected to each other via a bus 504. An input/output interface 505 is also connected to the bus 504.

The following components are connected to the input/output interface 505: an input portion 506 including a keyboard, a mouse or the like; an output portion 507 including a display such as a Cathode Ray Tube (CRT) and a Liquid Crystal Display (LCD), a loudspeaker or the like; the storage portion 508 including a hard disk or the like; and a communication portion 509 including a network interface card such as a local area network (LAN) card, a modem or the like. The communication portion 509 performs communication processing via a network such as the Internet.

A driver 510 may also be connected to the input/output interface 505 as needed. A removable medium 511 such as a magnetic disk, an optical disk, a magneto-optical disk, and a semiconductor memory is mounted on the driver 510 as needed, so that a computer program read from the removable medium 511 is installed into the storage portion 508 as needed.

In a case that the above series of processing is implemented by software, the program constituting the software is installed from the network such as the Internet or the storage medium such as the removable medium 511.

Those skilled in the art should understand that the storage medium is not limited to the removable medium 511 shown in FIG. 5 that stores the program and is distributed separately from the apparatus so as to provide the program to the user. Examples of the removable medium 511 include a magnetic disk (including a floppy disk (registered trademark)), an optical disk (including a compact disk read only memory (CD-ROM) and a digital versatile disc (DVD)), a magneto-optical disk (including a MiniDisc (MD) (registered trademark)), and a semiconductor memory. Alternatively, the storage medium may be the ROM 502, a hard disk included in the storage portion 508 or the like. The storage medium has a program stored therein and is distributed to the user together with a device in which the storage medium is included.

Preferred embodiments of the present disclosure are described above with reference to the accompanying drawings. However, the present disclosure is not limited to the above examples. Those skilled in the at can make various changes and modifications within the scope of the appended claims. It should be understood that these changes and modifications naturally fall within the technical scope of the present disclosure.

For example, multiple functions included in one unit in the above embodiments may be implemented by separate apparatuses. Alternatively, multiple functions implemented by multiple units in the above embodiments may be implemented by separate apparatuses, respectively. In addition, one of the above functions may be implemented by multiple units. Such configuration is included in the technical scope of the present disclosure.

In this specification, the steps described in the flowchart include not only processing performed in time series in the described order, but also processing performed in parallel or individually rather than necessarily in time series. Furthermore, the steps performed in time series may be performed in other order appropriately.

In addition, the technology according to the present disclosure may also be configured as follows.

Note 1. A method for training a classification model, including:

performing training on the classification model using a first sample set and a second sample set, to calculate a classification loss of the classification model;

extracting a weight vector and a feature vector of each sample in the first sample set and the second sample set;

calculating a mean weight vector of weight vectors of all samples in the first sample set and a mean feature vector of feature vectors of all samples in the first sample set;

calculating a weight loss based on a difference of the weight vector of each sample in the second sample set from the mean weight vector, and calculating a feature loss based on a difference of a feature vector of each sample in the second sample set from the mean feature vector;

calculating a total loss of the classification model based on the classification loss and at least one of the feature loss and the weight loss; and adjusting a parameter of the classification model based on the total loss until a predetermined condition is satisfied, to obtain a trained classification model.

Note 2. The method according to Note 1, wherein the weight loss and the mean weight vector are calculated based on the following equations, respectively:

$$L_{W\_up} = \sum_{i \in C_l} \|\|w_i\|_2^2 - w_{mean}\|$$

$$w_{mean} = \frac{1}{m} \sum_{j \in C_h} \|w_j\|_2^2$$

where $L_{W\_up}$ represents the weight loss, $C_l$ represents the second sample set, $w_i$ represents a weight vector of an i-th sample in the second sample set, $w_{mean}$ represents the mean weight vector, $C_h$ represents the first sample set, m represents the number of first samples in the first sample set, $w_j$ represents a weight vector of j-th sample in the first sample set.

Note 3. The method according to Note 1, wherein the feature loss and the mean feature vector are calculated based on the following equations, respectively:

$$L_{F\_up} = \sum_{i \in C_l} \|\|f_i\|_2^2 - f_{mean}\|$$

$$f_{mean} = \frac{1}{m} \sum_{j \in C_h} \|f_j\|_2^2$$

where $L_{F\_up}$ represents the feature loss, $C_l$ represents the second sample set, $f_i$ represents a feature vector of an i-th sample in the second sample set, $f_{mean}$ represents the mean feature vector, $C_h$ represents the first sample set, m represents the number of first samples in the first sample set, $f_j$ represents a feature vector of a j-th sample in the first sample set.

Note 4. The method according to Note 1, wherein the first sample set includes a head data sample set, and the second sample set includes a long tail data sample set.

Note 5. The method according to Note 1, wherein the classification loss includes a Softmax loss.

Note 6. The method according to Note 1, wherein the predetermined condition includes that the total loss reaches a predetermined value or that the number of the training reaches a predetermined number of times.

Note 7. The method according to Note 1, wherein the classification model includes a model based on a neural network.

Note 8. The method according to Note 1, wherein the total loss is calculated based on the following equation:

$$L = L_C + \lambda_1 L_{W\_up} + \lambda_2 L_{F\_up}$$

where L represents the total loss of the classification model, $L_C$ represents the classification loss of the classification model, $L_{W\_up}$ represents the weight loss, $L_{F\_up}$ represents the feature loss, $\lambda_1$ and $\lambda_2$ are hyper-parameters.

Note 9. The method according to Note 8, wherein in a case that the total loss is calculated based on the classification loss, the feature loss and the weight loss, $\lambda_1$ is set to be greater than 0 and $\lambda_2$ is set to be greater than 0;

in a case that the total loss is calculated based on the classification loss and the weight loss, $\lambda_1$ is set to be greater than 0 and $\lambda_2$ is set to be 0; and in a case that the total loss is calculated based on the classification loss and the feature loss, $\lambda_1$ is set to be 0 and $\lambda_2$ is set to be greater than 0.

Note 10. The method according to Note 1, wherein the classification model is used for face recognition.

Note 11. An apparatus for training a classification model, including:

a training unit configured to perform training on the classification model using a first sample set and a second sample set, to calculate a classification loss of the classification model;

a vector extracting unit configured to extract a weight vector and a feature vector of each sample in the first sample set and the second sample set;

a mean vector calculating unit configured to calculate a mean weight vector of weight vectors of all samples in the first sample set and a mean feature vector of feature vectors of all samples in the first sample set;

a loss calculating unit configured to calculate a weight loss based on a difference of the weight vector of each sample in the second sample set from the mean weight vector, and to calculate a feature loss based on a difference of a feature vector of each sample in the second sample set from the mean feature vector;

a total loss calculating unit configured to calculate a total loss of the classification model based on the classification loss and at least one of the feature loss and the weight loss; and an adjusting unit configured to adjust a parameter of the classification model based on the total loss until a predetermined condition is satisfied, to obtain a trained classification model.

Note 12. The apparatus according to Note 11, wherein the weight loss and the mean weight vector are calculated based on the following equations, respectively:

$$L_{W\_up} = \sum_{i \in C_l} \|\|w_i\|_2^2 - w_{mean}\|$$

$$w_{mean} = \frac{1}{m} \sum_{j \in C_h} \|w_j\|_2^2$$

where $L_{W\_up}$ represents the weight loss, $C_l$ represents the second sample set, $w_i$ represents a weight vector of an i-th sample in the second sample set, $w_{mean}$ represents the mean weight vector, $C_h$ represents the first sample set, m represents the number of first samples in the first sample set, $w_j$ represents a weight vector of a j-th sample in the first sample set.

Note 13. The apparatus according to Note 11, wherein the feature loss and the mean feature vector are calculated based on the following equations, respectively:

$$L_{F\_up} = \sum_{i \in C_l} \|\|f_i\|_2^2 - f_{mean}\|$$

$$f_{mean} = \frac{1}{m} \sum_{j \in C_h} \|f_j\|_2^2$$

where $L_{F\_up}$ represents the feature loss, $C_l$ represents the second sample set, $f_i$ represents a feature vector of an i-th sample in the second sample set, $f_{mean}$ represents the mean feature vector, $C_h$ represents the first sample set, m represents the number of first samples in the first sample set, $f_j$ represents a feature vector of a j-th sample in the first sample set.

Note 14. The apparatus according to Note 11, wherein the first sample set includes a head data sample set, and the second sample set includes a long tail data sample set.

Note 15. The apparatus according to Note 11, wherein the classification loss includes a Softmax loss.

Note 16. The apparatus according to Note 11, wherein the predetermined condition includes that the total loss reaches a predetermined value or that the number of the training reaches a predetermined number of times.

Note 17. The apparatus according to Note 11, wherein the classification model includes a model based on a neural network.

Note 18. The apparatus according to Note 11, wherein the total loss is calculated based on the following equation:

$$L = L_C + \lambda_1 L_{W\_up} + \lambda_2 L_{F\_up}$$

where L represents the total loss of the classification model, $L_C$ represents the classification loss of the classification model, $L_{W\_up}$ represents the weight loss, $L_{F\_up}$ represents the feature loss, and as and A are hyper-parameters.

Note 19. The apparatus according to Note 18, wherein in a case that the total loss is calculated based on the classification loss, the feature loss and the weight loss, XI is set to be greater than 0 and $\lambda_2$ is set to be greater than 0;

in a case that the total loss is calculated based on the classification loss and the weight loss, $\lambda_1$ is set to be greater than 0 and $\lambda_2$ is set to be 0; and in a case that the total loss is calculated based on the classification loss and the feature loss, $\lambda_1$ is set to be 0 and $\lambda_2$ is set to be greater than 0.

Note 20. A classification method for performing classification on an object to be classified with a classification model obtained by performing training using the method according to any one of Notes 1 to 10 or the apparatus according to any one of Notes 11 to 19, including:

inputting the object to be classified into the classification model, and performing classification on the object to be classified based on an output of at least one of feature extraction layers of the classification model.

The invention claimed is:

1. A method for training a classification model, comprising:

performing training on the classification model using a first sample set and a second sample set, to calculate a classification loss of the classification model;

extracting a weight vector and a feature vector of each sample in the first sample set and the second sample set;

calculating a mean weight vector of weight vectors of all samples in the first sample set and a mean feature vector of feature vectors of all samples in the first sample set;

calculating a weight loss based on a difference of the weight vector of each sample in the second sample set from the mean weight vector, and calculating a feature loss based on a difference of the feature vector of each sample in the second sample set from the mean feature vector;

calculating a total loss of the classification model based on the classification loss and at least one of the feature loss and the weight loss; and adjusting a parameter of the classification model based on the total loss until a predetermined condition is satisfied, to obtain a trained classification model.

2. The method according to claim 1, wherein the weight loss and the mean weight vector are calculated based on the following equations, respectively:

$$L_{W\_up} = \sum_{i \in C_l} |\|w_i\|_2^2 - w_{mean}|$$

$$w_{mean} = \frac{1}{m} \sum_{j \in C_h} \|w_j\|_2^2$$

where $L_{W\_up}$ represents the weight loss, $C_l$ represents the second sample set, $w_i$ represents a weight vector of an i-th sample in the second sample set, $w_{mean}$ represents the mean weight vector, $C_h$ represents the first sample set, m represents a number of first samples in the first sample set, $w_j$ represents a weight vector of a j-th sample in the first sample set.

3. The method according to claim 1, wherein the feature loss and the mean feature vector are calculated based on the following equations, respectively:

$$L_{F\_up} = \sum_{i \in C_l} |\|f_i\|_2^2 - f_{mean}|$$

$$f_{mean} = \frac{1}{m} \sum_{j \in C_h} \|f_j\|_2^2$$

where $L_{F\_up}$ represents the feature loss, $C_l$ represents the second sample set, $f_i$ represents a feature vector of an i-th sample in the second sample set, $f_{mean}$ represents the mean feature vector, $C_h$ represents the first sample set, in represents a number of first samples in the first sample set, $f_j$ represents a feature vector of a j-th sample in the first sample set.

4. The method according to claim 1, wherein the first sample set comprises a head data sample set, and the second sample set comprises a long tail data sample set.

5. The method according to claim 1, wherein the classification loss comprises a Softmax loss.

6. The method according to claim 1, wherein the predetermined condition comprises that the total loss reaches a predetermined value or that a number of the training reaches a predetermined number of times.

7. The method according to claim 1, wherein the classification model comprises a model based on a neural network.

8. The method according to claim 1, wherein the total loss is calculated based on the following equation:

$$L = L_C + \lambda_1 L_{W\_up} + \lambda_2 L_{F\_up}$$

where L represents the total loss of the classification model, $L_C$ represents the classification loss of the classification model, $L_{W\_up}$ represents the weight loss, $L_{F\_up}$ represents the feature loss, and $\lambda_1$ and $\lambda_2$ are hyper-parameters.

9. The method according to claim 8, wherein in a case that the total loss is calculated based on the classification loss, the feature loss and the weight loss, $\lambda_1$ is set to be greater than 0 and $\lambda_2$ is set to be greater than 0;

in a case that the total loss is calculated based on the classification loss and the weight loss, $\lambda_1$ is set to be greater than 0 and $\lambda_2$ is set to be 0; and in a case that the total loss is calculated based on the classification loss and the feature loss, $\lambda_1$ is set to be 0 and $\lambda_2$ is set to be greater than 0.

10. The method according to claim 1, wherein the classification model is used for face recognition.

11. An apparatus for training a classification model, comprising:

a training unit configured to perform training on the classification model using a first sample set and a second sample set, to calculate a classification loss of the classification model;

a vector extracting unit configured to extract a weight vector and a feature vector of each sample in the first sample set and the second sample set;

a mean vector calculating unit configured to calculate a mean weight vector of weight vectors of all samples in the first sample set and a mean feature vector of feature vectors of all samples in the first sample set;

a loss calculating unit configured to calculate a weight loss based on a difference of the weight vector of each sample in the second sample set from the mean weight vector, and to calculate a feature loss based on a difference of the feature vector of each sample in the second sample set from the mean feature vector;

a total loss calculating unit configured to calculate a total loss of the classification model based on the classification loss and at least one of the feature loss and the weight loss; and an adjusting unit configured to adjust a parameter of the classification model based on the total loss until a predetermined condition is satisfied, to obtain a trained classification model.

12. The apparatus according to claim 11, wherein the weight loss and the mean weight vector are calculated based on the following equations, respectively:

$$L_{W\_up} = \sum_{i \in C_l} ||\,||w_i||_2^2 - w_{mean}\,||$$

$$w_{mean} = \frac{1}{m} \sum_{j \in C_h} ||w_j||_2^2$$

where $L_{W\_up}$ represents the weight loss, $C_l$ represents the second sample set, $w_i$ represents a weight vector of an i-th sample in the second sample set, $w_{mean}$ represents the mean weight vector, $C_h$ represents the first sample set, in represents the number of first samples in the first sample set, $w_j$ represents a weight vector of a j-th sample in the first sample set.

13. The apparatus according to claim 11, wherein the feature loss and the mean feature vector are calculated based on the following equations, respectively:

$$L_{F\_up} = \sum_{i \in C_l} ||\,||f_i||_2^2 - f_{mean}\,||$$

$$f_{mean} = \frac{1}{m} \sum_{j \in C_h} ||f_j||_2^2$$

where $L_{F\_up}$ represents the feature loss, $C_l$ represents the second sample set, $f_i$ represents a feature vector of an i-th sample in the second sample set, $f_{mean}$ represents the mean feature vector, $C_h$ represents the first sample set, m represents the number of first samples in the first sample set, $f_j$ represents a feature vector of a j-th sample in the first sample set.

14. The apparatus according to claim 11, wherein the first sample set comprises a head data sample set, and the second sample set comprises a long tail data sample set.

15. The apparatus according to claim 11, wherein the classification loss includes a Softmax loss.

16. The apparatus according to claim 11, wherein the predetermined condition includes that the total loss reaches a predetermined value or that the number of the training reaches a predetermined number of times.

17. The apparatus according to claim 11, wherein the classification model includes a model based on a neural network.

18. The apparatus according to claim 11, wherein the total loss is calculated based on the following equation:

$$L = L_C + \lambda_1 L_{W\_up} + \lambda_2 L_{F\_up}$$

where L represents the total loss of the classification model, $L_C$ represents the classification loss of the classification model, $L_{W\_up}$ represents the weight loss, $L_{F\_up}$ represents the feature loss, and $\lambda_1$ and $\lambda_2$ are hyper-parameters.

19. The apparatus according to claim 18, wherein in a case that the total loss is calculated based on the classification loss, the feature loss and the weight loss, $\lambda_1$ is set to be greater than 0 and $\lambda_2$ is set to be greater than 0;

in a case that the total loss is calculated based on the classification loss and the weight loss, $\lambda_1$ is set to be greater than 0 and $\lambda_2$ is set to be 0; and in a case that the total loss is calculated based on the classification loss and the feature loss, $\lambda_1$ is set to be 0 and $\lambda_2$ is set to be greater than 0.

20. A classification method for performing classification on an object to be classified with a classification model obtained by performing training using the method according to claim 1, comprising:

inputting the object to be classified into the classification model, and performing classification on the object to be classified based on an output of at least one of feature extraction layers of the classification model.

\* \* \* \* \*